United States Patent
Honma

(10) Patent No.: US 12,392,089 B2
(45) Date of Patent: Aug. 19, 2025

(54) LAMINATE AND FOOD PACKAGING MATERIAL

(71) Applicant: MITSUI CHEMICALS, INC., Tokyo (JP)

(72) Inventor: Shirou Honma, Yokohama (JP)

(73) Assignee: MITSUI CHEMICALS, INC., Tokyo (JP)

( * ) Notice: Subject to any disclaimer, the term of this patent is extended or adjusted under 35 U.S.C. 154(b) by 214 days.

(21) Appl. No.: 18/040,854

(22) PCT Filed: Aug. 4, 2021

(86) PCT No.: PCT/JP2021/028919
§ 371 (c)(1),
(2) Date: Feb. 7, 2023

(87) PCT Pub. No.: WO2022/030534
PCT Pub. Date: Feb. 10, 2022

(65) Prior Publication Data
US 2023/0295876 A1  Sep. 21, 2023

(30) Foreign Application Priority Data
Aug. 7, 2020 (JP) ................................. 2020-134400

(51) Int. Cl.
| | | |
|---|---|---|
| *D21H 19/82* | (2006.01) | |
| *B65D 65/42* | (2006.01) | |
| *D21H 19/24* | (2006.01) | |
| *D21H 27/10* | (2006.01) | |

(52) U.S. Cl.
CPC .......... *D21H 19/824* (2013.01); *B65D 65/42* (2013.01); *D21H 19/24* (2013.01); *D21H 27/10* (2013.01); *B65D 2565/387* (2013.01)

(58) Field of Classification Search
CPC ......... B32B 27/08; B32B 27/10; B32B 27/40; C08G 18/3206; C08G 18/3271; C08G 18/348; C08G 18/724; C08G 18/757; C08G 18/7642; C08G 18/8025; C08G 18/8029; C08G 18/8048; C08G 18/0823; C09D 175/04; D21H 19/40; D21H 19/62; D21H 19/84; D21H 21/16; D21H 19/82
See application file for complete search history.

(56) References Cited

U.S. PATENT DOCUMENTS

2004/0105941 A1    6/2004    Terada et al.

FOREIGN PATENT DOCUMENTS

| EP | 3620576 A1 | 3/2020 | |
|---|---|---|---|
| JP | 2003261130 A | 9/2003 | |
| JP | 2008265855 A | 11/2008 | |
| JP | 2012066868 A | 4/2012 | |
| JP | 2014051327 A | 3/2014 | |
| JP | 2015077780 A | 4/2015 | |
| JP | 2015104831 A * | 6/2015 | ............ B32B 27/10 |
| JP | 2019123152 A | 7/2019 | |

* cited by examiner

*Primary Examiner* — Abbas Rashid
*Assistant Examiner* — Matthew M Eslami
(74) *Attorney, Agent, or Firm* — RANKIN, HILL & CLARK LLP

(57) ABSTRACT

A laminate includes a paper substrate, an anchor coat layer disposed at a one-surface side of the paper substrate, and a barrier coat layer disposed at a one-surface side of the anchor coat layer. The paper substrate has a density of 0.72 g/cm$^3$ or more. The barrier coat layer contains a gas barrier polyurethane resin.

11 Claims, 1 Drawing Sheet

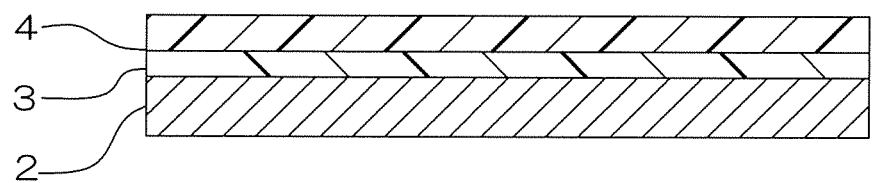
1

LAMINATE AND FOOD PACKAGING MATERIAL

The present invention relates to a laminate and a food packaging material. In particular, the present invention relates to a laminate including a paper substrate and a food packaging material including the laminate.

BACKGROUND ART

Conventionally, it has been known to coat the surface of a paper substrate with a gas barrier polyurethane resin to give gas barrier properties to the paper substrate.

For example, it has been proposed to produce a laminate by laminating an uncoated paper sheet with a basis weight of 70 g/m² with an anchor coat layer containing the first polyurethane resin and a layered inorganic compound and a barrier coat layer containing the second polyurethane resin and a layered inorganic compound and aging the laminate at 40° C. for three days (for example, see Patent Document 1 (Example 1)).

CITATION LIST

Patent Document

Patent Document 1: Japanese Unexamined Patent Publication No. 2015-104831

SUMMARY OF THE INVENTION

Problem to be Solved by the Invention

However, there is a disadvantage that the laminate cannot exhibit sufficient gas barrier properties without the aging.

The present invention provides a laminate with excellent gas barrier properties and a food packaging material including the laminate.

Means for Solving the Problem

The present invention [1] includes a laminate comprising: a paper substrate; a anchor coat layer disposed at a one-surface side of the paper substrate; and a barrier coat layer disposed at a one-surface side of the anchor coat layer, wherein the paper substrate has a density of 0.72 g/cm³ or more, and the barrier coat layer contains a gas barrier polyurethane resin.

The present invention [2] includes the laminate described in the above [1], wherein an air resistance measured in conformity with JIS P 8117 (2009) is 30000 s or more.

The present invention [3] includes the laminate described in the above [1] or [2], wherein in the barrier coat layer, the gas barrier polyurethane resin contains a secondary reaction product of an isocyanate group-terminated prepolymer and a chain extender, and the isocyanate group-terminated prepolymer is a primary reaction product of a polyisocyanate component containing xylylene diisocyanate and/or hydrogenated xylylene diisocyanate and an active hydrogen group-containing component containing a short chain diol having 2 to 6 carbon atoms and an active hydrogen compound having a hydrophilic group.

The present invention [4] includes the laminate described in any one of the above-described [1] to [3], wherein the barrier coat layer further contains a layered inorganic compound.

The present invention [5] includes the laminate described in any one of the above-described [1] to [4], wherein an amount of the barrier coat layer is 0.5 g/cm² or more and 20.0 g/cm² or less.

The present invention [6] includes the laminate described in any one of the above-described [1] to [5], wherein an amount of the anchor coat layer is 0.3 g/cm² or more and 20.0 g/cm² or less.

The present invention [7] includes a food packaging material comprising the laminate described in any one of the above-described [1] to [6].

Effects of the Invention

The laminate and food packaging material of the present invention include a paper substrate with a predetermined density and thus have excellent gas barrier properties.

BRIEF DESCRIPTION OF THE DRAWINGS

FIG. 1 is a schematic view of one embodiment of the laminate of the present invention.

DESCRIPTION OF THE EMBODIMENTS

FIG. 1 shows that a laminate 1 includes a paper substrate 2, an anchor coat layer 3 disposed at a one-surface side of the paper substrate 2, and a barrier coat layer 4 disposed at a one-surface side of the anchor coat layer 3.

The paper substrate 2 is a substrate consisting of paper. The paper is formed by making pulp. Examples of the pulp include natural pulp and synthetic pulp.

Paper with a predetermined density is selected as the paper substrate 2 of the laminate 1.

The density of the paper substrate 2 is 0.72 g/cm³ or more, preferably 0.75 g/cm³ or more, more preferably 0.80 g/cm³ or more, even more preferably 0.90 g/cm³ or more, even more preferably 1.00 g/cm³ or more.

When the density of the paper substrate 2 is the above-described lower limit or more, the degree of permeation of the anchor coat layer 3 (described below) and barrier coat layer 4 (described below) through the paper substrate 2 can appropriately be adjusted. Thus, a laminate 1 having excellent gas barrier properties in an unaged state is produced.

Further, the density of the paper substrate 2 is, for example, 1.50 g/cm³ or less, preferably 1.45 g/cm³ or less, more preferably 1.40 g/cm³ or less, even more preferably 1.35 g/cm³ or less, even more preferably 1.30 g/cm³ or less, particularly preferably 1.25 g/cm³ or less.

When the density of the paper substrate 2 is the upper limit or less, the anchor coat layer 3 (described below) and the barrier coat layer 4 (described below) can be disposed in a good orientation on the paper substrate 2. Thus, a laminate 1 having excellent gas barrier properties in an unaged state is produced.

The density of the paper is adjusted depending on the type of pulp and the method of making the pulp.

The thickness of the paper substrate 2 is, for example, 1 μm or more, preferably 3 μm or more, more preferably 5 μm or more. Further, the thickness of the paper substrate 2 is, for example, 500 μm or less, preferably 200 μm or less.

When the thickness of the paper substrate 2 is within the above-described range, a laminate 1 with excellent gas barrier properties is produced.

The basis weight of the paper substrate 2 is, for example, 20 g/m² or more, preferably 30 g/m² or more. Further, the basis weight of the paper substrate 2 is, for example, 400 g/m² or less, preferably 300 g/m² or less.

The gas barrier properties (described below) of the laminate in an unaged state do not correlate with the basis weight of the substrate 2 but correlate with the density of the paper substrate 2.

More specifically, examples of the paper substrate 2 include glassine paper, coated paper, and machine glazed Kraft paper.

These paper substrates 2 may be used alone or in combination of two or more.

The paper substrate 2 may be a single layer or a multilayer. When the paper substrate 2 is a multilayer, the layers of the multilayer may be the same kind of paper or two or more kinds.

A shape of the paper substrate 2 is not particularly limited. Examples of the shape of the paper substrate 2 include a sheet shape, a bottle shape, and a cup shape. Preferably, the paper substrate 2 has a sheet shape.

The paper substrate 2 may be subjected to a surface treatment. Examples of the surface treatment include a corona discharge treatment and a vapor deposition treatment.

The anchor coat layer 3 is disposed at least on a one-side surface of the paper substrate 2. The anchor coat layer 3 may be disposed on both surfaces of the paper substrate 2. The anchor coat layer 3 is preferably disposed only on the one-side surface of the paper substrate 2.

The anchor coat layer 3 includes an anchor coat resin.

Examples of the anchor coat resin include polyurethane resin, acrylic resin, polyolefin resin, polyethylene imine resin, polyvinyl alcohol resin, olefin-vinyl alcohol copolymer, styrene-butadiene copolymer, carboxy-modified styrene-butadiene copolymer, polyester resin, and chitosan.

These anchor coat resins may be used alone or in combination of two or more.

As the anchor coat resin, polyurethane resin, acrylic resin, polyvinyl alcohol resin and/or styrene-butadiene copolymer are/is used. More preferably, polyurethane resin is used.

Examples of the polyurethane resin also include the gas barrier polyurethane resin described below.

The anchor coat layer 3 is formed, for example, by coating the paper substrate 2 with an anchor coat agent and drying the anchor coat agent.

The anchor coat agent includes the above-described anchor coat resin and a known solvent.

As the solvent, a solvent that is inert with respect to the anchor coat resin is appropriately selected.

Examples of the solvent include water, methanol, ethanol, propanol, isopropanol, acetone, methyl ethyl ketone, ethyl acetate, tetrahydrofuran, and acetonitrile. These solvents may be used alone or in combination of two or more.

The blending ratio of the anchor coat resin and the solvent is appropriately set depending on the purpose and use.

A method for applying the anchor coat agent is not particularly limited. Examples of the application method include a dip coating method, a gravure coating method, a reverse coating method, a roll coating method, a bar coating method, a spray coating method, and an air knife coating method.

The drying conditions of the anchor coat agent are not particularly limited. For example, the drying temperature is, for example, 40° C. or more, preferably 50° C. or more. Further, the drying temperature is, for example, 200° C. or less, preferably 180° C. or less. The drying time is, for example, 0.1 minutes or more, preferably 0.2 minutes or more. Further, the drying time is, for example, 10 minutes or less, preferably 5 minutes or less.

In this manner, the anchor coat layer 3 is formed.

Further, the anchor coat layer 3 can contain an additive.

Examples of the additive include a filler, a silane coupling agent, an alkoxysilane compound, a thickener, an antioxidant, a heat stabilizer, an ultraviolet absorber, a plasticizer, an antistatic agent, a lubricant, an anti-blocking agent, a surfactant, a dispersion stabilizer, a colorant, a pigment, a dye, a colloidal silica, inorganic particles, inorganic oxide particles, a crystal nucleating agent, a cross-linking agent, and a curing agent. These additives may be used alone or in combination of two or more. The blending ratio of the additive is not particularly limited, and is appropriately set depending on the purpose and use.

As the additive, preferably, a filler is used. Examples of the filler include organic nanofibers and layered inorganic compounds. A layered inorganic compound is more preferably used. The layered inorganic compound is described in detail below.

The additive is added, for example, to the anchor coat agent and then applied and dried together with the anchor coat resin on the paper substrate 2.

An amount of the anchor coat layer 3 is, for example, 0.1 g/m² or more, preferably 0.3 g/m² or more, more preferably 0.5 g/m² or more, even more preferably 1.0 g/m² or more, particularly preferably 1.5 g/m² or more. Further, the amount of the anchor coat layer 3 is, for example, 30.0 g/m² or less, preferably 20.0 g/m² or less, more preferably 10.0 g/m² or less, even more preferably 5.0 g/m² or less, particularly preferably 3.0 g/m² or less.

When the amount of the anchor coat layer 3 is within the above-described range, a laminate 1 with excellent gas barrier properties can be produced.

The barrier coat layer 4 is a resin layer with gas barrier properties.

The gas barrier properties show properties of lowering the transmittance of oxygen. More specifically, the gas barrier properties are the properties of having a predetermined value of air resistance or more and a predetermined value or more of an oxygen transmittance rate.

The barrier coat layer 4 contains a gas barrier polyurethane resin.

More specifically, the barrier coat layer 4 is formed by preparing a barrier coat agent containing a gas barrier polyurethane resin, then applying the barrier coat agent on one surface of the anchor coat layer 3, and thereafter drying the barrier coat agent.

Examples of the barrier coat agent include an aqueous dispersion of gas barrier polyurethane resin.

Hereinafter, an aqueous dispersion of gas barrier polyurethane resin may be referred to as a polyurethane dispersion.

In the polyurethane dispersion, the gas barrier polyurethane resin includes a reaction product obtained by the reaction of at least the polyisocyanate component and the active hydrogen group-containing component.

More specifically, the gas barrier polyurethane resin is obtained by the reaction of the isocyanate group-terminated prepolymer with the chain extender. The isocyanate group-terminated prepolymer is obtained by the reaction of the polyisocyanate component with the active hydrogen group-containing component.

In other words, the isocyanate group-terminated prepolymer is a primary reaction product of the polyisocyanate component and the active hydrogen group-containing component. The gas barrier polyurethane resin is a secondary reaction product of the isocyanate group-terminated prepolymer and the chain extender.

A laminate 1 with excellent gas barrier properties is produced by using the gas barrier polyurethane resin described above.

In the preparation of the polyurethane dispersion, for example, an isocyanate group-terminated prepolymer is synthesized first.

The isocyanate group-terminated prepolymer is a polyurethane prepolymer having two or more free isocyanate groups at its molecular terminal.

The isocyanate group-terminated prepolymer is obtained, as described above, by the reaction of the polyisocyanate component with the active hydrogen group-containing component.

The polyisocyanate component includes, for example, xylylene diisocyanate (XDI) and/or hydrogenated xylylene diisocyanate ($H_6XDI$).

Examples of the xylylene diisocyanate include xylylene diisocyanate monomer (XDI monomer) and xylylene diisocyanate derivative (XDI derivative).

Examples of the xylylene diisocyanate monomer include 1,2-xylylene diisocyanate, 1,3-xylylene diisocyanate, and 1,4-xylylene diisocyanate.

These xylylene diisocyanate monomers may be used alone or in combination of two or more.

As the xylylene diisocyanate monomer, 1,3-xylylene diisocyanate and 1,4-xylylene diisocyanate are preferable. 1,3-xylylene diisocyanate is more preferable.

As the xylylene diisocyanate derivative, a modified product obtained by modifying the above-described xylylene diisocyanate monomer by a known method is used.

More specific examples of the xylylene diisocyanate derivative include multimers, allophanate modified products, polyol modified products, biuret-modified products, urea modified products, oxadiazine trione modified products, and carbodiimide modified products.

These xylylene diisocyanate derivatives may be used alone or in combination of two or more.

These xylylene diisocyanates may be used alone or in combination of two or more.

As the xylylene diisocyanate, xylylene diisocyanate monomer preferably is used.

Examples of the hydrogenated xylylene diisocyanate include hydrogenated xylylene diisocyanate monomer ($H_6XDI$ monomer) and hydrogenated xylylene diisocyanate derivative ($H_6XDI$ derivative).

The hydrogenated xylylene diisocyanate monomer is bis(isocyanatomethyl)cyclohexane.

Examples of the hydrogenated xylylene diisocyanate monomer include 1,2-hydrogenated xylylene diisocyanate, 1,3-hydrogenated xylylene diisocyanate, and 1,4-hydrogenated xylylene diisocyanate.

These hydrogenated xylylene diisocyanate monomers may be used alone or in combination of two or more.

As the hydrogenated xylylene diisocyanate monomer, 1,3-hydrogenated xylylene diisocyanate and 1,4-hydrogenated xylylene diisocyanate are preferable. 1,3-hydrogenated xylylene diisocyanate is more preferable.

Examples of the hydrogenated xylylene diisocyanate derivative include the same types of the above-described derivatives.

These hydrogenated xylylene diisocyanate derivatives may be used alone or in combination of two or more.

These hydrogenated xylylene diisocyanates may be used alone or in combination of two or more.

As the hydrogenated xylylene diisocyanate, hydrogenated xylylene diisocyanate monomer is preferable.

As the xylylene diisocyanate and/or hydrogenated xylylene diisocyanate, xylylene diisocyanate is preferable. Xylylene diisocyanate monomer is more preferable.

Further, the polyisocyanate component may also contain another polyisocyanate if necessary.

The other polyisocyanate is a polyisocyanate other than xylylene diisocyanate and hydrogenated xylylene diisocyanate.

Examples of the other polyisocyanate include industrially available polyisocyanates. More specific examples of the other polyisocyanate include an aromatic polyisocyanate, an araliphatic polyisocyanate (except for xylylene diisocyanate), an aliphatic polyisocyanate, and an alicyclic polyisocyanate (except for hydrogenated xylylene diisocyanate).

Further, the other polyisocyanate include the same types of the above-described derivatives.

The other polyisocyanates may be used alone or in combination of two or more.

As the other polyisocyanate, an alicyclic polyisocyanate is preferably used. Examples of the alicyclic polyisocyanate include methylenebis(cyclohexyl isocyanate) ($H_{12}MDI$).

When the polyisocyanate component contains another polyisocyanate, the ratio of the xylylene diisocyanate and hydrogenated xylylene diisocyanate to the other polyisocyanate is appropriately set within a range that does not reduce the excellent effects of the present invention.

For example, the content ratio of the xylylene diisocyanate or hydrogenated xylylene diisocyanate (or the content ratio of the total amount of them in a case in which they are used in combination) to the total amount of the polyisocyanate component is, for example, 50% by mass or more, preferably 60% by mass or more, more preferably 80% by mass or more, and, for example, 99% by mass or less.

As the polyisocyanate component, a combination of xylylene diisocyanate and hydrogenated xylylene diisocyanate is preferably used. More preferably, a combination of xylylene diisocyanate monomer and hydrogenated xylylene diisocyanate monomer is used.

When a combination of xylylene diisocyanate and hydrogenated xylylene diisocyanate is used, the xylylene diisocyanate with respect to 100 parts by mass of the total amount of the combination is, for example, 60 parts by mass or more, preferably 70 parts by mass or more, more preferably 80 parts by mass or more, and, for example, 95 parts by mass or less, preferably 93 parts by mass or less, more preferably 90 parts by mass or less.

Further, the hydrogenated xylylene diisocyanate with respect to 100 parts by mass of the total amount of the combination is, for example, 5 parts by mass or more, preferably 7 parts by mass or more, more preferably 10 parts by mass or more, and, for example, 40 parts by mass or less, preferably 30 parts by mass or less, more preferably 20 parts by mass or less.

Examples of the active hydrogen group-containing component include polyol components.

The polyol component contains, for example, a short chain diol having 2 to 6 carbon atoms.

A short chain diol having 2 to 6 carbon atoms is an organic compound having two hydroxyl groups and 2 to 6 carbon atoms.

The short chain diol has a molecular weight of 50 or more and 650 or less. When the short chain diol has a molecular weight distribution, the molecular weight indicates a number average molecular weight in terms of polystyrene by GPC measurement.

Examples of the short chain diol include alkanediols having 2 to 6 carbon atoms, ether diols having 2 to 6 carbon atoms, and alkene diols having 2 to 6 carbon atoms.

Examples of the alkanediol having 2 to 6 carbon atoms include ethylene glycol, propylene glycol, 1,3-propane diol, 1,4-butylene glycol, 1,3-butylene glycol, 1,2-butylene glycol, 1,5-pentanediol, 1,6-hexanediol, neopentyl glycol, 3-methyl-1,5-pentanediol, 1,3-cyclohexanediol, and 1,4-cyclohexanediol.

Examples of the ether diol having 2 to 6 carbon atoms include diethylene glycol, triethylene glycol, and dipropylene glycol.

Examples of the alkene diol having 2 to 6 carbon atoms include 1,4-dihydroxy-2-butene.

These short chain diols may be used alone or in combination of two or more.

As the short chain diol, from the viewpoint of gas barrier properties, an alkanediol having 2 to 6 carbon atoms is preferably used, and an ethylene glycol is more preferably used.

The content ratio of the short chain diol having 2 to 6 carbon atoms to 100 parts by mass of the total amount of the polyol component is, for example, 10 parts by mass or more, preferably 30 parts by mass or more, more preferably 50 parts by mass or more, and, for example, 90 parts by mass or less, preferably 80 parts by mass or less, more preferably 70 parts by mass or less.

Further, when the gas barrier polyurethane resin is prepared as a polyurethane dispersion, the polyol component contains an active hydrogen group-containing compound containing a hydrophilic group.

The active hydrogen group-containing compound containing a hydrophilic group is a compound containing a hydrophilic group and an active hydrogen group.

Examples of the active hydrogen group include a hydroxyl group and an amino group.

Examples of the hydrophilic group include a nonionic group and an ionic group.

More specific examples of the active hydrogen group-containing compound containing a hydrophilic group include an active hydrogen group-containing compound containing a nonionic group and an active hydrogen group-containing compound containing an ionic group.

The active hydrogen group-containing compound containing a nonionic group is a compound containing one or more nonionic group(s) and two or more active hydrogen groups in combination. Examples of the nonionic group include a polyoxyethylene group.

Examples of the active hydrogen group-containing compound having a nonionic group include polyoxyethylene glycol, a one end-capped polyoxyethylene glycol, and a polyol containing a polyoxyethylene side chain.

Examples of the active hydrogen group-containing compound having an ionic group include an active hydrogen group-containing compound containing an anionic group and an active hydrogen group-containing compound containing a cationic group.

The active hydrogen group-containing compound containing an anionic group is a compound having one or more anionic group(s) and two or more active hydrogen groups in combination. Examples of the anionic group include a carboxy group (carboxylic acid group) and a sulfo group (sulfonic acid group).

The active hydrogen group-containing compound containing a cationic group is a compound having one or more cationic group(s) and two or more active hydrogen groups. Examples of the cationic group include a quaternary ammonium group.

These active hydrogen group-containing compounds containing a hydrophilic group may be used alone or in combination of two or more.

As the active hydrogen group-containing compound containing a hydrophilic group, preferably, an active hydrogen group-containing compound containing an anionic group is used.

Examples of the anionic group in the active hydrogen group-containing compound containing an anionic group include a carboxy group (carboxylic acid group) and a sulfo group (sulfonic acid group).

In the viewpoint of the gas barrier properties and water resistance properties, preferably, a carboxy group is used as the anionic group.

Examples of the active hydrogen group in the active hydrogen group-containing compound containing an anionic group include a hydroxyl group and an amino group. Preferably, a hydroxyl group is used.

In other words, as the active hydrogen group-containing compound containing an anionic group, preferably, an organic compound having a carboxy group and two hydroxyl groups in combination is used.

Examples of the organic compound having a carboxy group and two hydroxyl groups in combination include a carboxy group-containing polyol.

Examples of the carboxy group-containing polyol include polyhydroxyalkanoic acids.

Examples of the polyhydroxyalkanoic acid include 2,2-dimethylolacetic acid, 2,2-dimethylollactic acid, 2,2-dimethylolpropionic acid (also known as dimethylolpropionic acid), 2,2-dimethylolbutanoic acid, 2,2-dimethylolbutyric acid, and 2,2-dimethylolvaleric acid.

These organic compounds having a carboxy group and two hydroxyl groups may be used alone or in combination of two or more.

As the organic compound having a carboxy group and two hydroxyl groups, preferably, 2,2-dimethylolpropionic acid is used.

The content ratio of the active hydrogen group-containing compound having a hydrophilic group to 100 parts by mass of the total amount of the polyol component is, for example, 10 parts by mass or more, preferably 20 parts by mass or more, and, for example, 50 parts by mass or less, preferably 40 parts by mass or less.

The polyol component can further contain, as an optional component, another low-molecular-weight polyol.

The other low-molecular-weight polyol is a low-molecular-weight polyol other than a short chain diol having 2 to 6 carbon atoms and an active hydrogen group-containing compound containing a hydrophilic group.

The low-molecular-weight polyol is an organic compound having two or more hydroxyl groups in a molecule and having a relatively low molecular weight.

The low-molecular-weight polyol has a molecular weight of 50 or more and 650 or less, preferably 500 or less.

Examples of the other low-molecular-weight polyols include a diol having 7 or more carbon atoms and a low-molecular-weight polyol having a functionality of three or more.

Examples of the diol having 7 or more carbon atoms include alkane (7 to 20 carbon atoms)-1,2-diol, 2,6-dimethyl-1-octene-3,8-diol, 1,3-cyclohexanedimethanol, 1,4-cyclohexanedimethanol, hydrogenated bisphenol A, and bisphenol A.

These diols having 7 or more carbon atoms may be used alone or in combination of two or more.

Examples of the low-molecular-weight polyol having a functionality of three or more include trihydric alcohols and tetrahydric alcohols.

Examples of the trihydric alcohol include glycerin, 2-methyl-2-hydroxymethyl-1,3-propane diol, 2,4-dihydroxy-3-hydroxymethylpentane, 1,2,6-hexanetriol, trimethylolpropane, and 2,2-bis(hydroxymethyl)-3-butanol.

Examples of the tetrahydric alcohol include tetramethylolmethane (pentaerythritol) and diglycerin.

These low-molecular-weight polyols having a functionality of three or more may be used alone or in combination of two or more.

Further, examples of the other low-molecular-weight polyol include a polyether polyol having a number average molecular weight of 650 or less, a polyester polyol having a number average molecular weight of 650 or less, and a polycarbonate polyol having a number average molecular weight of 650 or less.

The other low-molecular-weight polyols may be used alone or in combination of two or more.

As the other low-molecular-weight polyol, from the viewpoint of the water resistance properties and the water dispersion stability, preferably, a low-molecular-weight polyol having a functionality of three or more is used. More preferably, a trihydric alcohol is used. Particularly preferably, trimethylolpropane is used.

When the other low-molecular-weight polyol is contained, the content ratio of the other low-molecular-weight polyol to 100 parts by mass of the total amount of the polyol component is, for example, 0.2 parts by mass or more, preferably 1 part by mass or more, more preferably 2 parts by mass or more, and, for example, 20 parts by mass or less, preferably 10 parts by mass or less, more preferably 8 parts by mass or less.

The ratio of the other low-molecular-weight polyol to 100 parts by mass of the total amount of a combination of the short chain diol having 2 to 6 carbon atoms and the other low-molecular-weight polyol is, for example, 2 parts by mass or more, preferably 5 parts by mass or more, and, for example, 20 parts by mass or less, preferably 15 parts by mass or less, more preferably 10 parts by mass or less.

Further, with respect to 100 parts by mass of the total amount of the short chain diol having 2 to 6 carbon atoms and the other low-molecular-weight polyol, the active hydrogen group-containing compound containing a hydrophilic group is, for example, 10 parts by mass or more, preferably 20 parts by mass or more, more preferably 40 parts by mass or more, and, for example, 90 parts by mass or less, preferably 80 parts by mass or less, more preferably 70 parts by mass or less.

When the content ratio of the other low-molecular-weight polyol is within the above-described range, excellent dispersibility can be ensured. Thus, a barrier coat layer with excellent gas barrier properties can suitably be formed.

The polyol component can further contain a high-molecular-weight polyol as an optional component.

The high-molecular weight polyol is an organic compound (polymer) having two or more hydroxyl groups in a molecule and having a relatively high molecular weight. The high-molecular-weight polyol has a number average molecular weight of, for example, more than 650, and, for example, 20000 or less.

Examples of the high-molecular-weight polyol include polyether polyol, polyester polyol, polycarbonate polyol, polyurethane polyol, epoxy polyol, vegetable oil polyol, polyolefin polyol, acrylic polyol, and vinyl monomer-modified polyol.

These high-molecular-weight polyols may be used alone or in combination of two or more.

However, the high-molecular-weight polyol may reduce the gas barrier properties of the polyurethane resin (described below). Thus, the polyol component preferably does not contain a high-molecular-weight polyol.

In other words, the polyol component preferably consists of a short chain diol having 2 to 6 carbon atoms, a low-molecular-weight polyol having a functionality of three or more, and an active hydrogen group-containing compound a hydrophilic group, or consists of a short chain diol having 2 to 6 carbon atoms and an active hydrogen group-containing compound containing a hydrophilic group.

More preferably, the polyol component consists of a short chain diol having 2 to 6 carbon atoms, a low-molecular-weight polyol having a functionality of three or more, and an active hydrogen group-containing compound containing an anionic group, or consists of a short chain diol having 2 to 6 carbon atoms and an active hydrogen group-containing compound containing an anionic group.

The isocyanate group-terminated prepolymer is obtained by the reaction of the above-described components in a predetermined equivalent ratio.

For the synthesis of the isocyanate group-terminated prepolymer, the equivalent ratio shows the equivalent ratio (isocyanate group/hydroxyl group) of the isocyanate group to the active hydrogen group (hydroxyl group).

The equivalent ratio (isocyanate group/hydroxyl group) is, for example, more than 1, preferably 1.1 or more. Further, the equivalent ratio (isocyanate group/hydroxyl group) is, for example, 20 or less, preferably 10 or less.

For the synthesis of the isocyanate group-terminated prepolymer, a known polymerization method is employed.

Examples of the polymerization method include bulk polymerization and solution polymerization.

As the polymerization method, from the viewpoint of the adjustment of reactivity, solution polymerization is preferably used.

In bulk polymerization, for example, the above-described components are blended and reacted under a nitrogen atmosphere. The reaction temperature is, for example, 75 to 85° C. The reaction time is, for example, 1 to 20 hours.

In solution polymerization, for example, the above-described components are blended and reacted in an organic solvent under a nitrogen atmosphere. The reaction temperature is, for example, 20 to 80° C. The reaction time is, for example, 1 to 20 hours.

Examples of the organic solvent include organic solvents that are inert with respect to isocyanate groups. Examples of the organic solvent include acetone, methyl ethyl ketone, ethyl acetate, tetrahydrofuran, and acetonitrile. These organic solvents may be used alone or in combination of two or more.

In the above-described polymerization, as necessary, a catalyst can be added. Examples of the catalyst include amine-based catalysts and organic metal catalysts. These catalysts may be used alone or in combination of two or more. The adding amount of the catalyst is appropriately set depending on the purpose and use.

Further, in this method, the above-described polymerization is completed, for example, when the isocyanate group concentration in the reaction product reaches the range described below. In this method, the unreacted polyisocyanate component can be removed by a known removal method. Examples of the removal method include distillation and extraction.

In this manner, an isocyanate group-terminated prepolymer is produced.

The isocyanate group concentration in the isocyanate group-terminated prepolymer is, for example, 4% by mass or more, preferably 5% by mass or more, more preferably 6% by mass or more. Further, the isocyanate group concentration in the isocyanate group-terminated prepolymer is, for example, 25% by mass or less, preferably 20% by mass or less, more preferably 17% by mass or less, even more preferably 15% by mass or less.

Further, an average functionality of the isocyanate group is, for example, 1.5 or more, preferably 1.9 or more, more preferably 2.0 or more. Further, an average functionality of the isocyanate group is, for example, 3.0 or less, preferably 2.5 or less.

Furthermore, when the isocyanate group-terminated prepolymer contains an anionic group, for example, a neutralizing agent is added to the isocyanate group-terminated prepolymer in order to neutralize the isocyanate group-terminated prepolymer and form the salt of the anionic group.

Examples of the neutralizing agent include a conventional base. Examples of the base include an organic base and an inorganic base.

Examples of the organic base include tertiary amines and secondary amines.

Examples of the tertiary amine include trialkylamine and alkanolamine. Examples of the trialkylamine include trialkylamine having 1 to 4 carbon atom(s). Examples of the trialkylamine having 1 to 4 carbon atom(s) include trimethylamine and trimethylamine. Examples of the alkanolamine include dimethylethanolamine, methyldiethanolamine, triethanolamine, and triisopropanolamine.

Examples of the secondary amine include heterocyclic amines. Examples of the heterocyclic amine include morpholine.

These organic bases may be used alone or in combination of two or more.

Examples of the inorganic base include ammonia, alkali metal hydroxide, alkaline earth metal hydroxide, and alkali metal carbonate. Examples of the alkali metal hydroxide include lithium hydroxide, sodium hydroxide, and potassium hydroxide. Examples of the alkaline earth metal hydroxide include magnesium hydroxide and calcium hydroxide. Examples of the alkali metal carbonate include sodium carbonate and potassium carbonate.

These inorganic bases may be used alone or in combination of two or more.

These neutralizing agents may be used alone or in combination of two or more.

As the neutralizing agent, preferably, an organic base is used. More preferably, a tertiary amine is used. Even more preferably, trialkylamine is used. Particularly preferably, triethylamine is used.

The neutralizing agent is added, per 1 equivalent of anionic group, in an amount of 0.4 equivalents or more, preferably 0.6 equivalents or more. Further, the adding amount of the neutralizing agent per 1 equivalent of anionic group is, for example, 1.2 equivalents or less, preferably 1.0 equivalent or less.

Next, in this method, the isocyanate group-terminated prepolymer (a primary reaction product) is reacted with a chain extender to produce a gas barrier polyurethane resin (a secondary reaction product).

For example, the isocyanate group-terminated prepolymer is reacted with the chain extender in water, thereby producing a polyurethane dispersion.

The chain extender is an organic compound having a plurality of active hydrogen groups and subjecting the isocyanate group-terminated prepolymer to a chain extension reaction.

Examples of the chain extender include polyamine and aminoalcohol.

Examples of the polyamine include aromatic polyamine, araliphatic polyamine, alicyclic polyamine, aliphatic polyamine, and polyoxyethylene group-containing polyamine.

Examples of the aromatic polyamine include 4,4'-diphenylmethanediamine and tolylenediamine.

Examples of the araliphatic polyamine include 1,3-xylylene diamine and 1,4-xylylene diamine.

Examples of the alicyclic polyamine include 3-aminomethyl-3,5,5-trimethylcyclohexylamine (also called: isophoronediamine), 4,4'-dicyclohexylmethanediamine, 2,5-bis(aminomethyl) bicyclo[2.2.1] heptane, 2,6-bis(aminomethyl) bicyclo[2.2.1] heptane, 1,4-cyclohexanediamine, 1-amino-3-aminomethyl-3,5,5-trimethylcyclohexane, bis-(4-aminocyclohexyl) methane, diaminocyclohexane, 3,9-bis(3-aminopropyl)-2,4,8,10-tetraoxaspiro[5,5] undecane, 1,3-bis(aminomethyl) cyclohexane, and 1,4-bis(aminomethyl) cyclohexane.

Examples of the aliphatic polyamine include ethylenediamine, propylene diamine, 1,3-propane diamine, 1,4-butanediamine, 1,5-pentanediamine, 1,6-hexamethylenediamine, hydrazine, hydrazine hydrate, diethylenetriamine, triethylenetetramine, tetraethylenepentamine, 1,2-diaminoethane, 1,2-diaminopropane, and 1,3-diaminopentane.

Examples of the polyoxyethylene group-containing polyamine include polyoxyalkylene etherdiamine. Examples of the polyoxyalkylene etherdiamine include polyoxyethylene etherdiamine. More specifically, examples thereof include PEG #1000 diamine (manufactured by NOF Corporation), Jeffamine ED-2003 (manufactured by Huntsman Inc.), Jeffamine EDR-148 (manufactured by Huntsman Inc.), and Jeffamine XTJ-512 (manufactured by Huntsman Inc.).

Examples of the aminoalcohol include 2-((2-aminoethyl) amino) ethanol (also called: N-(2-aminoethyl) ethanolamine) and 2-((2-aminoethyl) amino)-1-methylpropanol (also called: N-(2-aminoethyl) isopropanolamine).

Examples of the chain extender further include an alkoxysilyl compound having a primary amino group and an alkoxysilyl compound having a primary amino group and a secondary amino group.

Examples of the alkoxysilyl compound having a primary amino group include γ-aminopropyltrimethoxysilane, γ-aminopropyltriethoxysilane, and N-phenyl-γ-aminopropyltrimethoxysilane.

Examples of the alkoxysilyl compound having a primary amino group and a secondary amino group include N-β (aminoethyl) γ-aminopropyltrimethoxysilane (also called: N-2-(aminoethyl)-3-aminopropyltrimethoxysilane), N-β (aminoethyl) γ-aminopropyltriethoxysilane (also called: N-2-(aminoethyl)-3-aminopropyltriethoxysilane), N-β (aminoethyl) γ-aminopropylmethyldimethoxysilane (also called: N-2-(aminoethyl)-3-aminopropylmethyldimethoxysilane), and N-β (aminoethyl) γ-aminopropylmethyldiethoxysilane (also called: N-2-(aminoethyl)-3-aminopropylmethyldiethoxysilane).

These chain extenders may be used alone or in combination of two or more.

For the chain extender, preferably, aminoalcohol is used. More preferably, 2-((2-aminoethyl) amino) ethanol is used.

The method of reacting the isocyanate group-terminated prepolymer with the chain extender in water is not particularly limited.

For example, first, the isocyanate group-terminated prepolymer is dispersed in water. Next, the chain extender is added to the water dispersion liquid of the isocyanate group-terminated prepolymer, thereby extending the chain of the isocyanate group-terminated prepolymer with the chain extender.

The method of dispersing the isocyanate group-terminated prepolymer in water is not particularly limited.

For example, while water is being stirred, the isocyanate group-terminated prepolymer is added to the water. In such a case, with respect to 100 parts by mass of the isocyanate group-terminated prepolymer, the water is 100 to 1000 parts by mass.

Thereafter, while the water in which the isocyanate group-terminated prepolymer is water-dispersed is being stirred, the chain extender is dropped in the water. In such a case, the equivalent ratio (active hydrogen group/isocyanate group) of the active hydrogen group of the chain extender to the isocyanate group of the isocyanate group-terminated prepolymer is, for example, 0.6 to 1.2.

The chain extension reaction is completed, for example, at normal temperature. The time until the completion of the reaction is, for example, 0.1 to 10 hours.

In this method, to adjust the solid content concentration, the organic solvent and/or water can be removed after the completion of the reaction. Alternatively, in this method, water can be added after the completion of the reaction to adjust the solid content concentration.

In this manner, a polyurethane dispersion (PUD) is produced as a barrier coat agent.

The polyurethane dispersion has a solid content concentration of, for example, 10% by mass or more, preferably 15% by mass or more, more preferably 20% by mass or more. Further, the solid content concentration of the polyurethane dispersion is, for example, 60% by mass or less, preferably 50% by mass or less, more preferably 40% by mass or less.

The polyurethane dispersion has a pH of, for example, 5 or more, preferably 6 or more. Further, the pH of the polyurethane dispersion is, for example, 11 or less, preferably 10 or less.

The polyurethane dispersion has an average particle size of, for example, 10 nm or more, preferably 20 nm or more, more preferably 50 nm or more. Further, the average particle size of the polyurethane dispersion is, for example, 500 nm or less, preferably 300 nm or less, more preferably 200 nm or less.

Furthermore, the urethane group concentration and urea group concentration in total in the polyurethane dispersion is relatively high. Increasing the urethane group concentration and urea group concentration can improve the gas barrier properties.

The total of the urethane group concentration and the urea group concentration is, for example, 30% by mass or more, preferably 34% by mass or more, more preferably 38% by mass or more. Further, the total of the urethane group concentration and urea group concentration is, for example, 50% by mass or less, preferably 46% by mass or less, more preferably 42% by mass or less. Furthermore, the total of the urethane group concentration and urea group concentration is calculated from the ratio of the charged amount of the material components.

The barrier coat layer 4 is formed, for example, by applying and drying the barrier coat agent on the anchor coat layer 3.

The method of applying the barrier coat agent is not particularly limited. Examples of the application method include a dipping method, gravure coating method, reverse coating method, roll coating method, bar coating method, spray coating method, and air knife coating method.

The conditions for drying the barrier coat agent are not particularly limited. For example, the drying temperature is, for example, 40° C. or more, preferably 50° C. or more. Further, the drying temperature is, for example, 200° C. or less, preferably 180° C. or less. Further, the drying time is, for example, 0.1 minutes or more, preferably 0.2 minutes or more. Further, the drying time is, for example, 10 minutes or less, preferably 5 minutes or less.

In this manner, the barrier coat layer 4 is formed.

The barrier coat layer 4 can be aged as necessary.

The conditions for aging the barrier coat layer 4 are not particularly limited. For example, the aging temperature is, for example, 20° C. or more, preferably 30° C. or more. Further, the aging temperature is, for example, 100° C. or less, preferably 80° C. or less. Further, the aging time is, for example, 1 hour or more, preferably 10 hours or more. Further, the aging time is, for example, 10 days or less, preferably 7 days or less.

The barrier coat layer 4 is preferably not aged from the viewpoint of the improvement of the manufacturing efficiency and the reduction in the lead time.

Further, the barrier coat layer 4 can include an additive.

Examples of the additive include fillers, silane coupling agents, alkoxysilane compounds, thickeners, antioxidants, heat stabilizers, ultraviolet absorbers, plasticizers, antistatic agents, lubricants, anti-blocking agents, surfactants, dispersion stabilizers, colorants, pigments, dyes, colloidal silicas, inorganic particles, inorganic oxide particles, crystal nucleating agents, cross-linking agents, and curing agents. These additives may be used alone or in combination of two or more. The blending ratio of the additive is not particularly limited and is appropriately set depending on the purpose and use.

As the additive, preferably, a filler is used. Examples of the filler include organic nanofibers and layered inorganic compounds. More preferably, a layered inorganic compound is used.

When the barrier coat layer 4 contains a layered inorganic compound, a laminate 1 with excellent gas barrier properties is produced.

Examples of the filler include organic nanofibers and layered inorganic compounds.

As the filler, from the viewpoint of the gas barrier properties, a layered inorganic compound is preferably used.

Examples of the layered inorganic compound include a swellable layered inorganic compound and a non-swellable layered inorganic compound.

As the layered inorganic compound, from the viewpoint of the gas barrier properties, a swellable layered inorganic compound is preferably used.

The swellable layered inorganic compound is a clay mineral consisting of an ultrathin unit crystal. The swellable layered inorganic compound has properties in which a solvent coordinates and/or absorbs and swells between unit crystal layers.

Examples of the swellable layered inorganic compound include hydrous silicates, kaolinite-group clay minerals, antigorite-group clay minerals, smectite-group clay minerals, vermiculite-group clay minerals, and mica-group clay minerals.

Examples of the hydrous silicate include phyllosilicate minerals.

Examples of the kaolinite-group clay mineral include halloysite, kaolinite, endellite, dickite, and nacrite.

Examples of the antigorite-group clay mineral include antigorite and chrysotile.

Examples of the smectite-group clay mineral include montmorillonite, beidellite, nontronite, saponite, hectorite, sauconite, and stevensite.

Examples of the vermiculite-group clay mineral include vermiculite.

Examples of the mica-group clay mineral include mica, margarite, tetrasilicic mica, teniolite, and synthetic mica.

The swellable layered inorganic compound may be a natural clay mineral or may be a synthetic clay mineral.

Further, these swellable layered inorganic compounds may be used alone or in combination of two or more.

As the swellable layered inorganic compound, a smectite-group clay mineral, a mica-group clay mineral, and synthetic mica are preferable. Synthetic mica is more preferable.

An average particle size of the filler is, for example, 50 nm or more, preferably 100 nm or more.

Further, the average particle size of the filler is, for example, 10 μm or less, preferably 5 μm or less, more preferably 3 μm or less.

An aspect ratio of the filler is, for example, 50 or more, preferably 100 or more, more preferably 200 or more.

Further, the aspect ratio of the filler is, for example, 5000 or less, preferably 3000 or less, more preferably 2000 or less.

The filler can be blended as a 100% solid content or as a dispersion liquid in which the filler is dispersed in a solvent.

The blending ratio of the filler is not particularly limited.

For example, with respect to 100 parts by mass of the gas barrier polyurethane resin, the filler is, for example, 5 parts by mass or more, preferably 10 parts by mass or more, more preferably 30 parts by mass or more.

Further, with respect to 100 parts by mass of the gas barrier polyurethane resin, the filler is, for example, 70 parts by mass or less, preferably 60 parts by mass or less.

The additive is, for example, added to the barrier coat agent, and applied and dried together with the gas barrier polyurethane resin on the paper substrate 2.

The timing of the adding of the additive is not particularly limited. For example, the additive may be added at the synthesis of the gas barrier polyurethane resin. Further, for example, the additive may be added to the polyurethane dispersion including the gas barrier polyurethane resin.

In the polyurethane dispersion, the total concentration (solid content concentration) of the gas barrier polyurethane resin and additive is, for example, 10% by mass or more, preferably 15% by mass or more, more preferably 20% by mass or more.

Further, in the polyurethane dispersion, the total concentration (solid content concentration) of the gas barrier polyurethane resin and additive is, for example, 60% by mass or less, preferably 50% by mass or less, more preferably 40% by mass or less.

Then, the polyurethane dispersion containing the gas barrier polyurethane resin and the additive are applied and dried on the anchor coat layer 3 under the above-described conditions, thereby forming a barrier coat layer 4 including the gas barrier polyurethane resin and the additive.

The amount of the barrier coat layer 4 is, for example, 0.1 g/m² or more, preferably 0.3 g/m² or more, more preferably 0.5 g/m² or more, even more preferably 1.0 g/m² or more, particularly preferably 1.5 g/m² or more. Further, the amount of the barrier coat layer 4 is, for example, 30.0 g/m² or less, preferably 20.0 g/m² or less, more preferably 10.0 g/m² or less, even more preferably 5.0 g/m² or less, particularly preferably 3.0 g/m² or less.

When the amount of the barrier coat layer 4 is within the above-described range, a laminate 1 with gas barrier properties is produced.

Further, the laminate 1 may include a functional layer not illustrated. The functional layer is, for example, a resin layer for giving the laminate 1 a desired functionality.

The functional layer is disposed at a one-surface side of the barrier coat layer 4 and/or the other-surface side of the paper substrate 2 by a known method. For example, the functional layer is formed by applying and drying an ionomer.

Examples of the functionality given by the functional layer include water resistance properties, oil resistance properties, and heat-sealing properties.

Further, in the laminate 1, the density of the paper substrate 2 is a predetermined lower limit or more. Thus, the degree of the permeation of the anchor coat layer 3 and barrier coat layer 4 through the paper substrate 2 is appropriately adjusted.

Further, in the laminate 1, the density of the paper substrate 2 is a predetermined upper limit or less. Thus, the anchor coat layer 3 and the barrier coat layer 4 can be disposed in a good orientation on the paper substrate 2.

As a result, the laminate 1 has excellent gas barrier properties, in particular, has excellent gas barrier properties in an unaged state.

The laminate 1 in an unaged state has an air resistance of, for example, 30000 s or more, preferably 50000 s or more, more preferably 70000 s or more, even more preferably 100000 s or more.

The air resistance is measured in conformity with JIS P 8117 (2009).

The air resistance of the laminate 1 in an unaged state can be adjusted by selecting a paper substrate 2 having a predetermine density. In other words, by using a paper substrate 2 having a predetermine density, a laminate 1 with excellent air resistance in an unaged state is produced.

The oxygen transmittance rate (OTR) of the laminate 1 in an unaged state is, for example, 800 cc/m²·day·atm or less, preferably 500 cc/m²·day·atm or less, more preferably 100 cc/m²·day·atm or less, even more preferably 50 cc/m²·day·atm or less, even more preferably 10 cc/m²·day·atm or less, even more preferably 5 cc/m²·day·atm or less, even more preferably 3 cc/m²·day·atm or less, particularly preferably 2 cc/m²·day·atm or less at 20° C. and relative humidity 70%. Further, the oxygen transmittance rate (OTR) of the laminate 1 is, for example, 0.001 cc/m²·day·atm or more.

The oxygen transmittance rate is measured in conformity with JIS K 7126-2 (2006).

The laminate 1 is suitably used for excellent gas barrier properties in various industrial fields. Preferably, the laminate 1 is suitably used as a food packaging material.

In other words, the food packaging material preferably includes the above-described the laminate 1.

Thus, the food packaging material has excellent gas barrier properties, in particular, has excellent gas barrier properties in an unaged state.

EXAMPLES

The present invention is described below with reference to Examples and Comparative Examples. The present invention is not limited to Examples in any way. The "parts" and "%" are based on mass unless otherwise specified. The specific numeral values used in the description below, such as mixing ratios (contents), physical property values, and parameters can be replaced with the corresponding mixing ratios (contents), physical property values, and parameters in the above-described "DESCRIPTION OF THE EMBODIMENTS", including the upper limit values (numeral values defined with "or less", and "less than") or the lower limit values (numeral values defined with "or more", and "more than").

Synthesis Example 1 (PUD)

The following material components were reacted at 65 to 70° C. under a nitrogen atmosphere until the isocyanate group concentration (NCO %) became 6.79% by mass or less. In this manner, a reaction solution including an isocyanate group-terminated prepolymer was produced.
Material Components
1,3-xylylene diisocyanate
(TAKENATE 500, 1,3-XDI, manufactured by Mitsui Chemicals, Inc.) 169.9 parts by mass 1,3-hydrogenated xylylene diisocyanate
(TAKENATE 600, 1,3 H₆XDI, manufactured by Mitsui Chemicals, Inc.) 29.2 parts by mass
Ethylene glycol 35.9 parts by mass
Trimethylolpropane 3.4 parts by mass
Dimethylolpropionic acid 18.2 parts by mass
Methyl ethyl ketone (solvent) 115.8 parts by mass
Then, the produced reaction solution was cooled to 40° C.
Then, 13.6 of triethylamine was added to the reaction solution, thereby neutralizing the isocyanate group-terminated prepolymer.
Next, the reaction solution was dispersed in 751.5 parts by mass of ion-exchange water with a homodisper. Next, an aqueous amine solution was added to the produced dispersion liquid, thereby causing chain extension reaction. Thereafter, the reacted dispersion liquid was aged for one hour.

The aqueous amine solution was a mixture of 59.6 parts by mass of ion-exchange water and 29.8 parts by mass of 2-((2-aminoethyl) amino) ethanol.

Thereafter, methyl ethyl ketone and ion-exchange water were distilled off with an evaporator. In this manner, the solid content concentration was adjusted to 30% by mass.

In this manner, a polyurethane dispersion containing a gas barrier polyurethane resin was produced.

Production Example 1 (Barrier Coat Agent)

28.3 parts by mass of the polyurethane dispersion (solid content concentration 30%) produced in Synthesis Example 1, 25.0 parts by mass of a water-dispersion liquid of synthetic mica (NTS-5, manufactured by TOPY INDUSTRIES, LIMITED., solid content concentration 6% by mass), and 46.7 parts by mass of water were mixed. In this manner, a barrier coat agent was produced.

Production Example 2 (Barrier Coat Agent)

33.3 parts by mass of the polyurethane dispersion (solid content concentration 30%) produced in Synthesis Example 1, 10 parts by mass of isopropanol as a solvent, and 56.7 parts by mass of water were mixed. In this manner, a barrier coat agent was produced.

Preparation Examples 1 to 10 (Anchor Coat Agent)

According to the formulations in Table 1, anchor coat agents were prepared.

In Preparation Example 1, acrylic polyol and a trimethylolpropane adduct of xylylene diisocyanate were reacted in ethyl acetate, thereby producing an anchor coat agent containing a polyurethane resin.

Further, in Preparation Examples 2 and 3, the solid content concentration of the polyurethane dispersion produced in Synthesis Example 1 was adjusted with water and/or alcohol, thereby producing an anchor coat agent.

Furthermore, in Preparation Examples 4 to 11, the solid content concentration of a commercially available anchor coat resin was adjusted with water or ethyl acetate, thereby producing an anchor coat agent.

TABLE 1

| | No. | Preparation Ex. 1 | Preparation Ex. 2 | Preparation Ex. 3 | Preparation Ex. 4 | Preparation Ex. 5 | Preparation Ex. 6 | Preparation Ex. 7 | Preparation Ex. 8 | Preparation Ex. 9 | Preparation Ex. 10 |
|---|---|---|---|---|---|---|---|---|---|---|---|
| Formulations (parts by mass) | PUD | — | 28.3 | 33.3 | — | — | — | — | — | — | — |
| | NTS-5 | — | 25.0 | — | — | — | — | — | — | — | — |
| | XMU-18 | 13.0 | — | — | — | — | — | — | — | — | — |
| | D-110N | 4.6 | — | — | — | — | — | — | — | — | — |
| | W-6061 | — | — | — | 33.3 | — | — | — | — | — | — |
| | OJb-51 | — | — | — | — | 40.0 | — | — | — | — | — |
| | EP501H | — | — | — | — | — | 22.2 | — | — | — | — |
| | Aqueous solution of acetic-acid-neutralized chitosan product | — | — | — | — | — | — | 50.0 | — | — | — |
| | Water-dispersion polyethylene imine | — | — | — | — | — | — | — | 100.0 | — | — |
| | PVA210 | — | — | — | — | — | — | — | — | 10.0 | — |
| | SR116 | — | — | — | — | — | — | — | — | — | 19.8 |
| | IPA | — | — | 10.0 | — | — | — | — | — | — | — |
| | Water | — | 46.7 | 56.7 | 66.7 | 60.0 | 77.8 | 50.0 | — | 90.0 | 80.2 |
| | Ethyl acetate | 82.3 | — | — | — | — | — | — | — | — | — |
| Solid content concentration (% by mass) | | 10.0 | 10.0 | 10.0 | 10.0 | 10.0 | 10.0 | 10.0 | 5.0 | 10.0 | 10.0 |

The abbreviations in Table are described in detail as follows.
PUD: the polyurethane dispersion of Synthesis Example 1
NTS-5: manufactured by TOPY INDUSTRIES, LIMITED., a water-dispersion liquid of synthetic mica, solid content concentration 6% by mass
XMU-18: manufactured by Mitsui Chemicals, Inc., an ethyl acetate solution of acrylic polyol, solid content concentration 50% by mass
D-110N: manufactured by Mitsui Chemicals, Inc., an ethyl acetate solution of a trimethylolpropane adduct of xylylene diisocyanate, solid content concentration 75% by mass
W-6061: manufactured by Mitsui Chemicals, Inc., a water-dispersion liquid of a water-dispersion polyurethane resin, solid content concentration 30% by mass
OHP-51b: manufactured by Mitsui Chemicals, Inc., a water-dispersion liquid of a water-dispersion acrylic resin, solid content concentration 25% by mass
EP501H: manufactured by Mitsui Chemicals, Inc., a water-dispersion liquid of a water-dispersion polyolefin resin, solid content concentration 45% by mass
Aqueous solution of acetic-acid-neutralized chitosan product: an aqueous solution obtained by adding 10 g of chitosan (Tokyo Chemical Industry Co., Ltd.) to 10 g of acetic acid and distilling the mixture with pure water until the solid content concentration becomes 20%.
Water-dispersion polyethylene imine: manufactured by MICA, trade name A-131-X, a water-dispersion liquid of polyethylene imine, solid content concentration 5% by mass
PVA 210: manufactured by Kuraray Co., Ltd., polyvinyl alcohol
SR116: manufactured by NIPPON A&L INC., a water-dispersion liquid of carboxy-modified styrene-butadiene copolymer, solid content concentration 50.5% by mass
IPA: manufactured by Tokyo Chemical Industry Co., Ltd., isopropanol, a solvent
Ethyl acetate: manufactured by Tokyo Chemical Industry Co., Ltd., a solvent Examples 1 to 14 and Comparative Examples 1 to 3

The paper substrates shown in Tables 2 to 4 were prepared.
Next, according to Tables 2 to 4, an anchor coat agent was applied on the surface of each paper substrate with a bar coater and dried at 120° C. for 90 seconds. In this manner, an anchor coat layer was formed.
Thereafter, according to Tables 2 to 4, a barrier coat agent was applied on the surface of each anchor coat layer with a bar coater and dried at 120° C. for 90 seconds. In this manner, a barrier coat layer was formed.
In this manner, laminates were produced.
In each of Examples and Comparative Examples, the barrier coat layer was not aged.

Reference Example 1

A laminate was produced by the same method as Comparative Example 3 except that the barrier coat layer was aged at 40° C. for three days.
<Evaluations>
(1) Air Resistance
The air resistance of the laminate was measured by using an Oken type Air-permeability & Smoothness Tester (manufactured by ASAHI SEIKO CO., LTD).
The measurement was carried out in conformity with JIS P 8117 (2009).
(2) Appearance
The appearance of the laminate was visually observed and evaluated by the following criteria.
Good: There is no problem.
Fair: Whitening of the laminate was slightly observed.
Bad: Whitening of the laminate and/or the peeling of the barrier coat layer were/was observed.
(3) Oxygen Transmittance Rate (OTR)
The oxygen transmittance rate of the laminate was measured by using an oxygen transmission rate testing system (OX-TRAN2/20, manufactured by MOCON, Inc.).
The conditions for the measurement were set at 20° C. and a relative humidity of 70% (70% RH).
The measurement was carried out in conformity with JIS K 7126-2 (2006).
The amount of oxygen transmittance (cc/m$^2$·day·atm) per 1 m$^2$, one day, and one atmosphere was measured.

TABLE 2

| No. | Example 1 | Example 2 | Example 3 | Example 4 | Example 5 | Example 6 | Example 7 |
|---|---|---|---|---|---|---|---|
| Paper substrate | Glassine paper A | Glassine paper B | Coated paper | Machine glazed Kraft paper | Glassine paper B | Coated paper | Coated paper |
| Density (g/cm$^3$) | 1.24 | 1.15 | 1.17 | 0.73 | 1.15 | 1.17 | 1.17 |
| Anchor coat agent | Preparation Ex. 1 | Preparation Ex. 1 | Preparation Ex. 1 | Preparation Ex. 1 | Preparation Ex. 2 | Preparation Ex. 3 | Preparation Ex. 4 |
| Thickness (g/m$^2$) | 2.0 | 2.0 | 2.0 | 2.0 | 2.0 | 2.0 | 2.0 |
| Barrier coat agent | Production Ex. 1 | Production Ex. 1 | Production Ex. 1 | Production Ex. 1 | Production Ex. 1 | Production Ex. 1 | Production Ex. 1 |
| Thickness (g/m$^2$) | 2.5 | 2.5 | 2.5 | 2.5 | 2.5 | 2.5 | 2.5 |
| Air resistance (s) | ∞ | ∞ | ∞ | ∞ | ∞ | ∞ | ∞ |
| Appearance | Good | Good | Good | Good | Good | Good | Good |
| OTR(cm$^3$/m$^2$ · day · atm) | 1.9 | 50.4 | 121.3 | 515.1 | 1.9 | 2.1 | 3.0 |

TABLE 3

| No. | Example 8 | Example 9 | Example 10 | Example 11 | Example 12 | Example 13 | Example 14 |
|---|---|---|---|---|---|---|---|
| Paper substrate | Coated paper | Coated paper | Coated paper | Coated paper | Coated paper | Coated paper | Coated paper |
| Density (g/cm$^3$) | 1.17 | 1.17 | 1.17 | 1.17 | 1.17 | 1.17 | 1.17 |
| Anchor coat agent | Preparation Ex. 5 | Preparation Ex. 6 | Preparation Ex. 7 | Preparation Ex. 8 | Preparation Ex. 9 | Preparation Ex. 10 | Preparation Ex. 1 |
| Thickness (g/m$^2$) | 2.0 | 2.0 | 2.0 | 2.0 | 2.0 | 2.0 | 2.0 |
| Barrier coat agent | Production Ex. 1 | Production Ex. 1 | Production Ex. 1 | Production Ex. 1 | Production Ex. 1 | Production Ex. 1 | Production Ex. 2 |
| Thickness (g/m$^2$) | 2.5 | 2.5 | 2.5 | 2.5 | 2.5 | 2.5 | 2.5 |
| Air resistance (s) | ∞ | ∞ | ∞ | ∞ | ∞ | ∞ | ∞ |
| Appearance | Good | Good | Fair | Fair | Good | Good | Good |
| OTR(cm$^3$/m$^2$ · day · atm) | 3.2 | 5.6 | 2.0 | 3.0 | 30.2 | 10.8 | 3.5 |

TABLE 4

| No. | Comp. Ex. 1 | Comp. Ex. 2 | Comp. Ex. 3 | Ref. Ex. 1 |
|---|---|---|---|---|
| Paper substrate | Coated paper | Bleached acid-free paper | Bleached acid-free paper | Bleached acid-free paper |
| Density (g/cm$^3$) | 1.17 | 0.71 | 0.71 | 0.71 |
| Anchor coat agent | — | Preparation Ex. 1 | Preparation Ex. 2 | Preparation Ex. 2 |
| Thickness (g/m$^2$) | — | 2.0 | 2.0 | 2.0 |
| Barrier coat agent | Production Ex. 1 | Production Ex. 1 | Production Ex. 1 | Production Ex. 1 |
| Thickness (g/m$^2$) | 2.5 | 2.5 | 2.5 | 2.5 |
| Air resistance (s) | 12000 | 16000 | 26000 | ∞ |
| Appearance | Good | Good | Good | Good |
| OTR(cc/m$^2$ · day · atm) | Unmeasurable | Unmeasurable | Unmeasurable | 3.1 |

The paper substrates are described in detail as follows.

Glassine paper A: a density of 1.24 g/cm$^3$, a basis weight of 30.8 g/m$^2$

Glassine paper B: a density of 1.15 g/cm$^3$, a basis weight of 32.1 g/m$^2$

Coated paper: a density of 1.17 g/cm$^3$, the basis weight of 68.0 g/m$^2$

Machine glazed Kraft paper: a density of 0.73 g/cm$^3$, a basis weight of 73.1 g/m$^2$ Bleached acid-free paper: a density of 0.71 g/cm$^3$, a basis weight of 71.3 g/m$^2$ While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The laminate and food packaging material of the present invention are suitably used in the food packaging industry.

DESCRIPTION OF REFERENCE NUMERALS 1 laminate
2 paper substrate
3 anchor coat layer
4 barrier coat layer

The invention claimed is:

1. A laminate comprising:
a paper substrate;
an anchor coat layer disposed at a one-surface side of the paper substrate; and
a barrier coat layer disposed at a one-surface side of the anchor coat layer, wherein the paper substrate has a density of 0.72 g/cm$^3$ or more,
the barrier coat layer contains a gas barrier polyurethane resin,
in the barrier coat layer, the gas barrier polyurethane resin contains a secondary reaction product of:
an isocyanate group-terminated prepolymer; and
a chain extender, and
the isocyanate group-terminated prepolymer is a primary reaction product of:
a polyisocyanate component containing xylylene diisocyanate and/or hydrogenated xylylene diisocyanate; and
an active hydrogen group-containing component containing a short chain diol having 2 to 6 carbon atoms and an active hydrogen compound having a hydrophilic group.

2. The laminate according to claim 1, wherein an air resistance measured in conformity with JIS P 8117 (2009) is 30000 s or more.

3. The laminate according to claim 1, wherein the barrier coat layer further contains a layered inorganic compound.

4. The laminate according to claim 1, wherein an amount of the barrier coat layer is 0.5 g/m$^2$ or more and 20.0 g/m$^2$ or less.

5. The laminate according to claim 1, wherein an amount of the anchor coat layer is 0.3 g/m$^2$ or more and 20.0 g/m$^2$ or less.

6. A food packaging material comprising the laminate according to claim 1.

7. The laminate according to claim 1, wherein the density of the paper substrate is 0.73 g/cm$^3$ or more.

8. The laminate according to claim 1, wherein the density of the paper substrate is 0.73 g/cm$^3$ or more and 1.24 g/cm$^3$ or less.

9. The laminate according to claim 1, wherein the barrier coat layer is not aged.

10. The laminate according to claim 7, wherein the barrier coat layer is not aged.

11. The laminate according to claim 8, wherein the barrier coat layer is not aged.

* * * * *